June 3, 1952 C. R. SUSKA 2,599,498
DIAPHRAGM VALVE
Filed Feb. 8, 1949
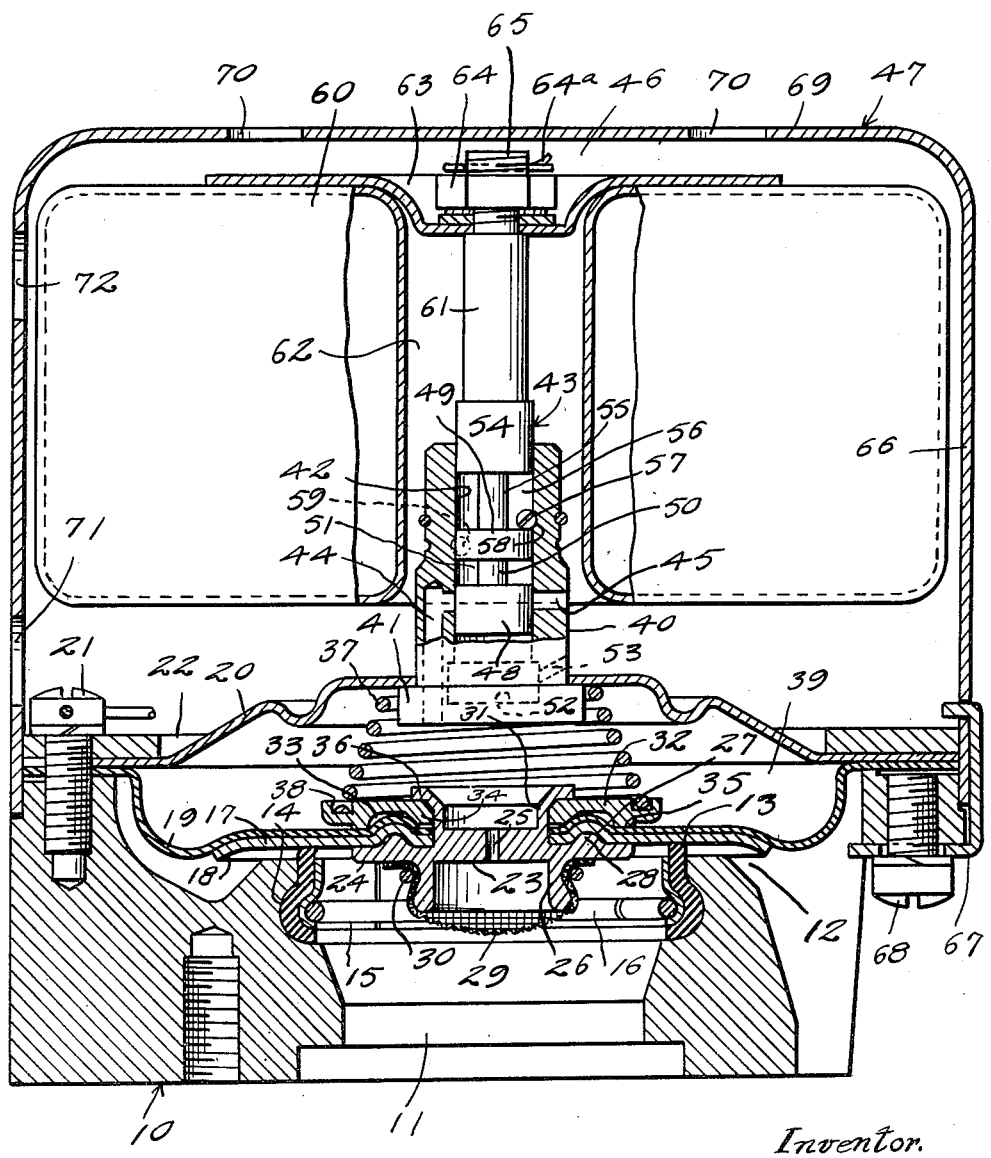
Inventor.
C. R. Suska
By Kimmel & Crowell
Attys.

Patented June 3, 1952

2,599,498

UNITED STATES PATENT OFFICE 2,599,498

DIAPHRAGM VALVE

Charles R. Suska, Corry, Pa., assignor to Aero Supply Mfg. Co., Inc., Corry, Pa.

Application February 8, 1949, Serial No. 75,117

4 Claims. (Cl. 251—119)

This invention relates to float valves, and is a continuation in part of my copending application Serial No. 58,200 filed November 4, 1948, for Reversible Float Valve.

An object of this invention is to provide a float valve which may be reversed as to its position and which includes an intake pressure operated valve member which is regulated as to its opening and closing by means of a float which in this instance is of the doughnut type.

Another object of this invention is to provide a float valve wherein the main valve member is carried by a flexible diaphragm forming one wall of a pressure chamber, and the pressure in the chamber is controlled by the position of a float connected to a second or pressure release valve member.

A further object of this invention is to provide a float valve structure which includes an apertured hood or shield engaging about the float so as to protect the float against sloshing and to minimize the effects of surging on the valve operation, the hood or shield being secured to the valve structure by means of an improved fastening means.

A further object of this invention is to provide an improved diaphragm operated valve structure which is regulated as to its movement by means of a float, the diaphragm being secured to the valve member by an improved clamping means.

A further object of this invention is to provide a float valve structure which has been designed particularly for use in fuel tanks, and includes a hollow metal float of the doughnut type which will not be affected as to its buoyancy by absorption or the like.

A further object of this invention is to provide a float valve embodying a main valve member carried by a diaphragm which forms one wall of a pressure chamber, the valve member and diaphragm being constantly urged to closing position by means of a spring which substantially balances the main valve member and diaphragm so that the main valve member and diaphragm will be moved to either open or closed position by a relatively light intake pressure.

With the above and other objects in view, my invention consists in the arrangement, combination and details of construction disclosed in the drawing and specification, and then more particularly pointed out in the appended claims.

In the drawing, the figure shows a vertical sectional view partly broken away and in section, of a float valve constructed according to an embodiment of this invention.

Referring to the drawing, the numeral 10 designates generally a valve body which is adapted to be secured to a suitable source of fluid supply and in the present instance the body 10 is associated with a main fuel tank and is connected to a pressure line which in turn is connected to one or more auxiliary fuel tanks.

The body 10 is provided with an intake passage 11 and an outlet 12. A resilient valve seat member 13 is mounted within the inner end of the intake passage 11 and in the present instance is formed of rubber, composition or the like, and the body 10 is formed with an annular groove 14 outwardly from the inner end of the passage 11 within which the seat member 13 is adapted to be tightly clamped, by means of a split clamping band 15 which is locked in the interior of the seat member 13 by means of a split locking ring 16.

A disc-shaped valve member or head 17 is adapted when in closed position to engage on the inner end of the seat 13 and the outer marginal portion of the main valve member 17 is downturned as indicated at 18. The main valve member 17 is carried by a flexible diaphragm 19 which is interposed between an inner head 20 and the inner end of the housing or body 10, being secured between the head 20 and the body 10 by fastening means 21.

A pressure applying ring 22 bears against the inner or upper side of the head 20 for tightly clamping the marginal portion of head 20 and the marginal portion of the diaphragm 19 to the body 10. The diaphragm 19 is secured to the valve member 17 by means of a fitting generally designated as 23. The fitting 23 includes a disc-shaped plate 24 which is formed with a central opening 25 and is also provided with an annular flange 26 at its lower or intake side.

The valve member 17 is formed with an annular bead 27 having the concave or grooved side thereof outermost, and the plate 24 is formed in its inner side with an annular bead 28 engaging in the groove or bead 27. A screen 29 engages about the annular flange 26, being secured to the flange 26 by means of a locking ring 30. The plate 24 is provided with a cylindrical extension or flange 31 extending from the inner side thereof, and extending through the center of valve member 17 and diaphragm 19.

An inner clamping plate 32 engages about the flange 31 and bears against the inner upper side of diaphragm 19. The clamping plate 32 is provided with an annular groove or channel 33 outwardly from the flange 31 so as to thereby form an annular clamping bead 34 bearing against the diaphragm 19 to tightly clamp the diaphragm 19 and valve member 17 together about the bead 27. A second annular clamping bead 35 is formed on plate 32 outwardly of bead 34 adapted to clamp diaphragm 19 to valve member 17 outwardly of bead 27.

The flange 31 at its inner or upper end is overturned as indicated at 36 so that the two plates 24 and 32 which are clamping plates will be tightly held on the valve member 17 and diaphragm 19. A tapered or conical spring 37 is interposed between plate 32 and the head 20 and bears at its lower or outer end against the inner clamping plate 32 and is seated in an annular groove 38 which is formed in the plate 32. The spring 37 is of such strength or tension that the diaphragm 19 and the valve member 17 will be constantly urged toward closing position but any light intake pressure in intake passage 11 with release of pressure in pressure chamber 39 which is formed between the diaphragm 19 and the head 20 will permit valve member 17 to move upwardly or inwardly to open position.

A pressure release housing 40 is carried by and extends upwardly from head 20, being formed at its lower end with an annular flange 41 disposed within the chamber 39 and provides a centering means for the upper small end of the spring 37. The release housing 40 is formed with a cylinder 42 within which a release valve member or piston generally designated as 43 is adapted to slidably engage. The housing 40 is provided with a lengthwise extending passage 44 opening through the lower end of the housing 40 into the chamber 39. The housing 40 is also provided with a horizontally disposed passage 45 communicating the lengthwise passage 44 with the float chamber 46 which is formed about the housing 40, by means of an apertured hood or shield 47.

The piston or valve member 43 includes a lower valve plug 48 and an intermediate valve plug 49 connected to the lower plug 48 by means of a small diameter connecting member or stem 50 which forms an annular groove 51 adapted upon lower or inward movement of piston 43 to register with the horizontal passage 45 so that float chamber 46 will be communicated with pressure chamber 39 in order to release the pressure of fluid in chamber 39.

The housing 40 is formed at its lower end with a chamber 52 which is connected with the float chamber 46 by means of an angled passage 53 so that any air or fluid in the chamber 52 will be released for passage into the float chamber 46 through the angled passage 53.

The piston or valve plug member 43 also includes an upper head 54 which is connected with the head or plug 49 by a small diameter stem 55 which forms an annular groove 56 within which a piston limiting pin 57 is adapted to loosely engage. The pin 57 in one position of the valve structure, as for instance the position shown in the drawing where the release valve housing 40 extends upwardly from the head 20, is adapted to be positioned in an opening 58 formed horizontally through the housing 40, whereas when the valve structure is inverted the pin 57 is adapted to be positioned in a second opening 59 spaced inwardly from the opening 58. When pin 57 is in opening 58, valve head 48 is the operating head and is adapted upon movement of plug or piston 43 to its uppermost position to intersect passage 45. When the valve structure is inverted the valve head 49 is the operating head and is adapted upon upward movement of the piston or plug 43 to intersect release passage 45.

A hollow float 60 is secured to a stem 61 extending from the plug or piston 43 and in the present instance the float 60 is of the doughnut type, being formed with a central opening 62, and the stem 61 is secured to the upper end of the float 60 by means of a dished plate 63 which may be fixed as by brazing, soldering or other suitable fastening means to the float 60 and secured to the stem 61 by means of a nut 64 which is threaded onto a threaded stud 65 carried by the upper end of the stem 61 and locked by means of a cotter pin 64a or other suitable locking means.

The hood or shield 47 is formed of a cylindrical side wall 66 which engages about the housing or body 10 and is secured thereto by means of one or more substantially C-shaped clips 67 which are secured to the body 10 by fastening means 68. The shield or hood 47 also includes an upper wall 69 formed with a plurality of openings 70 and the side wall 66 is formed with openings 71 and 72 spaced along the length thereof so that fluid can freely enter the hood or shield 47 to activate the float 60, but the shield 47 will prevent the sloshing of fluid in the tank from unduly affecting the operation of float 60.

In the use and operation of this valve structure, the body 10 is adapted to be connected to a source of fluid supply which is under pressure and the valve body 10 with its associated structure is adapted to be disposed within a fluid tank, such as the main or other fuel tank of an airplane. Assuming that the fluid in the tank is at a relatively low level, float 60 will be in its lower position wherein passage or groove 51 will be in registry with release passage 45. The pressure at this time will be released from pressure chamber 39 so that the intake pressure will move valve member 17 inwardly or upwardly to open position permitting the fluid to flow from intake passage 11 through outlet passage 12 into the tank. As the fluid rises in the tank this fluid will rise in the float chamber 46, raising float 60 and bringing valve head 48 into intersecting position across release passage 45. When valve head 48 is in intersecting position across release passage 45, pressure in pressure chamber 39 will build up by flow of fluid through the small opening 25 in fitting 23, and when pressure in chamber 39 is sufficiently built up, diaphragm 19 with valve member 17 will be moved downwardly to closing position with valve member 17 contacting valve seat member 13.

It will be understood that the valve structure hereinbefore described may be reversed as to its position with the float in the lowermost position. Where the valve structure is reversed, pin 57 will be disposed in opening 59 of release housing 40, and piston 43 will be moved upwardly a slight distance so that intermediate head 49 will be above pin 57. In the inverted position, when the float is in the down position groove 51 will register with passage 45, and when fluid rises in the tank head 49 will be moved upwardly to intersecting position across release passage 45. In either position of the valve structure pin 57 will be disposed in groove 56.

I do not mean to confine myself to the exact details of construction herein disclosed, but claim all variations falling within the purview of the appended claims.

What I claim is:

1. In a pressure operated valve structure including a valve housing, a valve member and a flexible diaphragm, an annular bead carried by said valve member projecting from one face of said valve member and forming an annular groove in the opposite face of said valve member, and clamping means for clamping said valve member and diaphragm together, said clamping means comprising a pair of plates, a bead carried by one of said plates engaging in the groove of said valve member, and a cylindrical flange carried by said one plate extending through said valve member, diaphragm and said other plate, the end of said flange being outwardly bent to form an annular clamping flange for clamping engagement with said other plate, said other plate having an annular groove within which that portion of said diaphragm deformed by said first named bead is adapted to engage, one edge of said latter groove engaging said diaphragm to clamp the latter against said first named bead.

2. In a pressure operated valve structure including a valve housing, a valve member and a flexible diaphragm, an annular bead carried by said valve member projecting from one face of said valve member and forming an annular groove in the opposite face of said valve member, and clamping means for clamping said valve member and diaphragm together, said clamping means comprising a pair of plates, a bead carried by one of said plates engaging in the groove of said valve member, a cylindrical flange carried by said one plate extending through said valve member, diaphragm and said other plate, the end of said flange being outwardly bent to form an annular clamping flange for clamping engagement with said other plate, said other plate having an annular groove within which that portion of said diaphragm deformed by said first named bead is adapted to engage, one edge of said groove engaging said diaphragm to clamp the latter against said first named bead, and an annular rib carried by said other plate outwardly of said latter named groove for binding engagement with said diaphragm.

3. In a valve structure a valve plate, a diaphragm at one side of said plate, and means securing said plate and diaphragm together, said plate including an annular bead confronting said diaphragm, said securing means comprising a pair of clamping plates, an annular flange carried by one of said clamping plates extending through said valve plate, diaphragm and the other of said clamping plates, an annular outwardly extending clamping flange formed on said cylindrical flange bearing against the other of said clamping plates, said other clamping plate having an annular channel within which the deformed portion of said diaphragm caused by said bead on said valve plate is adapted to engage, said channel being so disposed that one edge thereof is adapted to clampingly engage said deformed portion of said diaphragm.

4. In a valve structure a valve plate, a diaphragm at one side of said plate, and means securing said plate and diaphragm together, said plate including an annular bead confronting said diaphragm, said securing means comprising a pair of clamping plates, an annular flange carried by one of said clamping plates extending through said valve plate, diaphragm and the other of said clamping plates, an annular outwardly extending clamping flange formed on said flange bearing against the other of said clamping plates, said other clamping plate having an annular channel within which the deformed portion of said diaphragm caused by said bead on said valve plate is adapted to engage, said channel being so disposed that one edge thereof is adapted to clampingly engage said deformed portion of said diaphragm, and an annular rib carried by said other clamping plate outwardly of said channel tightly engaging against said diaphragm.

CHARLES R. SUSKA.

REFERENCES CITED

The following references are of record in the file of this patent:

UNITED STATES PATENTS

| Number | Name | Date |
|---|---|---|
| 1,062,300 | Pierce | May 20, 1913 |
| 1,248,650 | Gustafsen | Dec. 4, 1917 |
| 1,333,646 | Watrous | Mar. 16, 1920 |
| 1,676,084 | Flagg | July 3, 1928 |
| 1,806,360 | Moller | May 19, 1931 |
| 2,228,552 | Arbogast | Jan. 14, 1941 |
| 2,491,521 | Samiran | Dec. 20, 1949 |

FOREIGN PATENTS

| Number | Country | Date |
|---|---|---|
| 674 | Great Britain | of 1868 |
| 799 | Great Britain | of 1876 |
| 56,968 | Switzerland | of 1911 |